(12) United States Patent
Mou (10) Patent No.: US 10,868,462 B2
(45) Date of Patent: Dec. 15, 2020

(54) POWER TOOL

(71) Applicant: Positec Power Tools (Suzhou) Co., Ltd, Suzhou (CN)

(72) Inventor: Guoliang Mou, Suzhou (CN)

(73) Assignee: Positec Power Tools (Suzhou) Co., Ltd, Suzhou (CN)

(*) Notice: Subject to any disclaimer, the term of this patent is extended or adjusted under 35 U.S.C. 154(b) by 763 days.

(21) Appl. No.: 15/509,123

(22) PCT Filed: Sep. 2, 2015

(86) PCT No.: PCT/CN2015/088880
§ 371 (c)(1),
(2) Date: Jun. 27, 2017

(87) PCT Pub. No.: WO2016/034133
PCT Pub. Date: Mar. 10, 2016

(65) Prior Publication Data
US 2018/0241291 A1    Aug. 23, 2018

(30) Foreign Application Priority Data

Sep. 4, 2014    (CN) .......................... 2014 1 0448522

(51) Int. Cl.
*H02K 23/64*      (2006.01)
*H02K 23/08*      (2006.01)
(Continued)

(52) U.S. Cl.
CPC .............. *H02K 23/64* (2013.01); *A01D 34/78* (2013.01); *H02K 3/28* (2013.01); *H02K 23/08* (2013.01); *H02K 23/66* (2013.01)

(58) Field of Classification Search
CPC .......... H02K 3/04; H02K 23/64; H02K 23/06; H02K 23/66; A01D 69/02; A01D 34/81; A01D 34/78
See application file for complete search history.

(56) References Cited

U.S. PATENT DOCUMENTS 3,525,912 A    8/1970  Wallin
4,835,409 A *  5/1989  Bhagwat ............... A47L 9/2805
                                              307/64
(Continued)

FOREIGN PATENT DOCUMENTS

CN    1353881 A    6/2002
CN    1481974 A    3/2004
(Continued)

OTHER PUBLICATIONS

International Search Report from International Application No. PCT/CN2015/088880, dated Oct. 27, 2015, 6 pages with English translation.
(Continued)

*Primary Examiner* — Edgardo San Martin
(74) *Attorney, Agent, or Firm* — TraskBritt (57) ABSTRACT

An electric tool includes: a housing; a motor accommodated in the housing and providing power to a working component, the motor includes a stator including an excitation winding and a rotor including an armature winding, and the excitation winding is connected in series to the armature winding; a first power input unit, capable of connecting to an external AC power source so as to provide an alternating current to the motor; a second power input unit, capable of connecting to a battery component so as to provide a direct current to the motor; and a power source control unit, controlling the motor to obtain power input by using one of the first power input unit and the second power input unit. The electric tool can adapt to an AC power source and a DC power source, and the motor has a simple structure.

20 Claims, 5 Drawing Sheets

(51) Int. Cl.
*A01D 34/78* (2006.01)
*H02K 3/28* (2006.01)
*H02K 23/66* (2006.01)
*A01D 69/02* (2006.01)

(56) References Cited

U.S. PATENT DOCUMENTS

| | | | | |
|---|---|---|---|---|
| 5,160,868 | A * | 11/1992 | Yang | H02K 23/18 |
| | | | | 310/220 |
| 5,596,236 | A * | 1/1997 | Lee | A47L 9/2842 |
| | | | | 200/1 A |
| 6,172,437 | B1 * | 1/2001 | Du | H02K 23/36 |
| | | | | 310/136 |
| 6,329,788 | B1 | 12/2001 | Bailey et al. | |
| 6,417,646 | B1 | 7/2002 | Huykman et al. | |
| 6,448,732 | B1 * | 9/2002 | Block | H02J 7/0003 |
| | | | | 318/635 |
| 6,683,396 | B2 | 1/2004 | Ishida et al. | |
| 7,345,437 | B2 * | 3/2008 | Baer | A47L 9/2878 |
| | | | | 310/68 A |
| 7,479,754 | B2 | 1/2009 | Lucas et al. | |
| 7,482,768 | B2 | 1/2009 | Lucas et al. | |
| 7,728,534 | B2 | 6/2010 | Lucas et al. | |
| 7,728,535 | B2 | 6/2010 | Kumar et al. | |
| 7,741,793 | B2 | 6/2010 | Lucas et al. | |
| 7,781,902 | B2 | 8/2010 | Cerney et al. | |
| 7,834,503 | B2 * | 11/2010 | Bojiuc | H02K 23/64 |
| | | | | 310/154.06 |
| 7,884,560 | B2 | 2/2011 | Lucas et al. | |
| 8,376,667 | B2 | 2/2013 | Wilbert et al. | |
| 8,405,273 | B2 * | 3/2013 | Li | H02K 27/04 |
| | | | | 310/158 |
| 8,525,382 | B2 * | 9/2013 | Li | H02K 23/08 |
| | | | | 310/158 |
| 8,732,896 | B2 | 5/2014 | Lucas et al. | |
| 10,413,146 | B2 * | 9/2019 | Williams | H02K 23/64 |
| 2008/0089674 | A1 | 4/2008 | Lucas et al. | |
| 2008/0284363 | A1 | 11/2008 | Lucas et al. | |
| 2009/0081903 | A1 | 3/2009 | Zhang et al. | |
| 2009/0302704 | A1 * | 12/2009 | Li | H02K 23/64 |
| | | | | 310/158 |
| 2014/0190017 | A1 | 7/2014 | Máynez et al. | |
| 2014/0252996 | A1 | 9/2014 | Lucas et al. | |
| 2018/0076653 | A1 | 3/2018 | Forster et al. | |

FOREIGN PATENT DOCUMENTS

| | | |
|---|---|---|
| CN | 1153336 C | 6/2004 |
| CN | 101541578 A | 9/2009 |
| CN | 101790921 A | 8/2010 |
| CN | 102933354 A | 2/2013 |
| CN | 102237734 B | 8/2015 |
| CN | 102624312 B | 11/2018 |
| CN | 202014385 U | 10/2019 |
| EP | 1048329 A1 | 11/2000 |
| EP | 1214775 A1 | 6/2002 |
| EP | 2482444 A2 | 8/2012 |

OTHER PUBLICATIONS

International Written Opinion from International Application No. PCT/CN2015/088880, dated Oct. 27, 2015, 9 pages with English translation.

Optimal design of series-excited motor, ISSN: 1674-2796, 2012 (1): P1-3; 1994-2017 China Academic Journal Electronic Publishing House.

* cited by examiner

POWER TOOL

CROSS-REFERENCE TO RELATED APPLICATIONS

This application is a national phase entry under 35 U.S.C. § 371 of International Patent Application PCT/CN2015/088880, filed Sep. 2, 2015, designating the United States of America and published as International Patent Publication WO 2016/034133 A1 on Mar. 10, 2016, which claims the benefit under Article 8 of the Patent Cooperation Treaty to Chinese Patent Application Serial No. 201410448522.8, filed Sep. 4, 2014.

TECHNICAL FIELD

The present invention relates to an electric tool, in particular, to an electric tool suitable to be powered by an AC power source or a DC power source.

BACKGROUND

Generally, an electric tool includes two types. One type is powered by using an AC power source, and the other type is powered by using a DC power source. A tool powered by using an AC power source usually can be used at a place near a power socket. For electric tools with relatively wide working ranges such as a mower and a snow blower, a DC power source needs to be equipped for power supply, so as to work at a place away from a power socket. However, electric energy storage of a DC power source is limited. In a situation in which electric energy of a DC power source uses up, and an AC power source is available, if an electric tool can be selected to be connected to the AC power source to continue working, it brings great convenience to a user.

To resolve the foregoing problem, a person skilled in the art designs some solutions, so that an electric tool can be powered by an AC power source and also can be powered by a DC power source. For example, an electric tool including a specific motor implements adaption between the electric tool and different power sources by setting two sets of armature windings separately adapting to AC and DC power sources to rotate in a permanent magnetic field. However, because the motor used here needs corresponding two sets of commutators and electric brushes to separately match two groups of armature windings, the motor has a relatively complex structure. Another electric tool uses a power controller to adjust and modulate a voltage, and uses a buck controller and a power inverter to implement coexistence of AC and DC power sources. However, in this solution, a conversion between an alternating current and a direct current is necessary, so that energy loss is generated, and a lot of electronic devices are needed, and reliability is not high.

BRIEF SUMMARY

To overcome defects in the prior art, a problem to be resolved in the present invention is to provide an electric tool that has a simple structure, which can adapt to an AC power source and a DC power source.

To solve the above problem, technical proposal of the present invention is: An electric tool, comprising: a housing, a motor, accommodated in the housing, and providing power to a working component. The motor comprises a stator comprising an excitation winding and a rotor comprising an armature winding, and the excitation winding is connected in series to the armature winding. A first power input unit, capable of connecting to an external AC power source provides an alternating current to the motor; a second power input unit, capable of connecting to a battery component, provides a direct current to the motor; and a power source control unit, controls the motor to obtain power input by using one of the first power input unit and the second power input unit.

Preferably, the electric tool further comprises a battery component, and the battery component is connected to the second power input unit.

Preferably, power input voltages provided by the first power input unit and the second power input unit are basically within a same predetermined voltage range.

Preferably, the predetermined voltage range is 80 V to 120 V.

Preferably, the battery component comprises a battery pack and a rated voltage of the battery pack is 110 V.

Preferably, the battery component comprises two battery packs and a rated voltage of each the battery pack is 56V.

Preferably, the battery component is a lithium battery pack.

Preferably, the power source control unit comprises a mode selection switch, the mode selection switch operably connects one of the first power input unit and the second power input unit to the motor and disconnects the other one of the first power input unit and the second power input unit from the motor.

The present invention also provides an electric tool, comprising: a housing; a series excited motor, accommodated in the housing and providing power to a working component, the series excited motor comprises a stator, a rotor, and an electric brush. The stator comprises a stator iron core and an excitation winding, the rotor comprises a rotor iron core, an armature winding winded on the rotor iron core, a pivot supporting the rotor iron core to rotate, and a commutator fixed on the pivot. The commutator is connected to the electric brush, and the excitation winding is connected to the armature winding in series; and a power source control unit, comprising a mode selection switch operable to be in different working modes. When the mode selection switch is in an AC working mode, the motor obtains an alternating current, and when the mode selection switch is in a DC working mode, the motor obtains a direct current.

Preferably, the electric tool is an electric mower.

The present invention also provides an electric tool, comprising: a housing; a series excited motor, accommodated in the housing and providing power to a working component. The series excited motor comprises a stator, a rotor, and an electric brush. The stator comprises a stator iron core and an excitation winding, the rotor comprises a rotor iron core, an armature winding winded on the rotor iron core, a pivot supporting the rotor iron core to rotate, and a commutator fixed on the pivot. The electric brush is connected to the commutator, and the excitation winding is connected to the armature winding in series. A first power input unit, configured to provide an alternating current when being connected to an external AC power source and a second power input unit, connected to a battery component so as to provide a direct current to the motor. The first power input unit is directly connected to the motor. There is no rectifier between the first power input unit and the motor. Alternating current power input is not converted and directly provides electric power to the motor in a form of an alternating current and the motor runs after receiving the alternating current. Therefore, the external AC power source is directly connected to the motor instead of using complex control circuits converting an alternating current into a direct current and corresponding components, which can ensure normal operation of the electric tool and a simple structure.

The present invention also provides an electric tool, comprising: a housing and a series excited motor, accommodated in the housing and providing power to a working component. The series excited motor is selectively connected to one of an AC power source and a battery component. The motor is connected to an external AC power source and runs after receiving an alternating current or the motor is connected to a battery component and runs after receiving a direct current.

Preferably, the alternating current power input provided by the external AC power source is converted by voltage step-down into an alternating current of a relatively low voltage, and the alternating current is inputted to the motor. Therefore, the motor can run under an alternating current and can also run under a direct current. A user of the electric tool may select proper power input according to conditions.

Compared with the prior art, the motor used by the electric tool of the present invention includes an excitation winding and an armature winding that are connected in series and, therefore, multiple groups of commutators and electric brushes do not need to be set. Then the motor above can implement adaption between the electric tool and an AC power source or a DC power source. Meanwhile, the electric tool has a simple structure and low cost. Moreover, compared with an electric tool that needs rectification and step-down or step-up and inversion, because power input does not need to be subjected to alternating and direct current conversion and can directly power the motor, the electric tool of the present invention has small energy loss and high efficiency.

BRIEF DESCRIPTION OF THE DRAWINGS

The disclosure will become more fully understood from the detailed description given herein below for illustration only, and thus are not limitative of the disclosure, and wherein.

The present invention is further described with reference to the accompanying drawings and implementation manners in the below.

DETAILED DESCRIPTION

Figure 1:
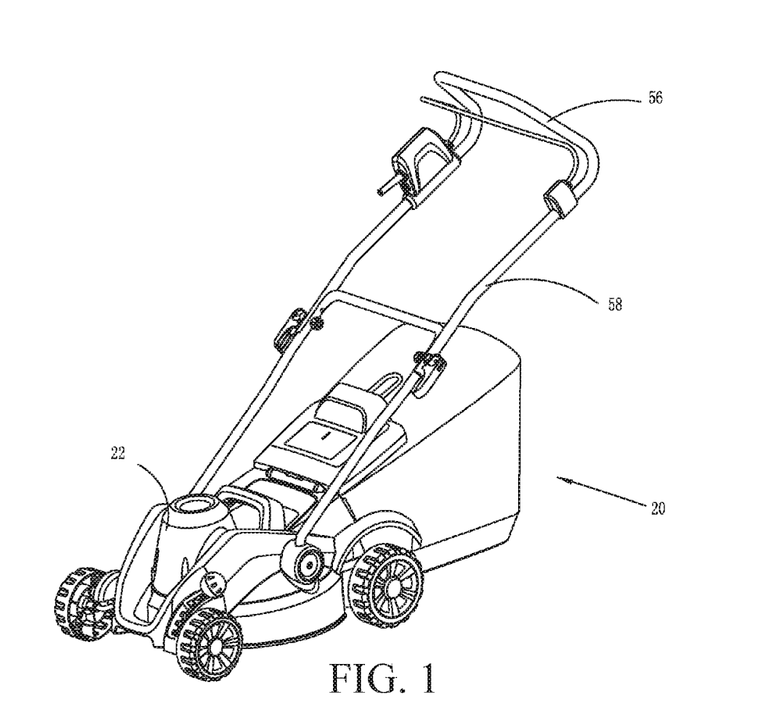
FIG. 1 is a stereoscopic schematic diagram of a mower according to a first embodiment of the present invention.

Referring to FIG. 1, a first embodiment of the present invention provides an electric tool, which is specifically a mower 20 for processing lawns. It should be specified that the mower 20 shown in the accompanying drawings may be understood as only being for an objective of examples and does not limit the present invention to a tool of any specific form. It can be foreseen that a similar gardening tool, such as a snow blower and a grass trimmer, may also be applicable. The foregoing electric tool can adapt to an AC or a DC power source, so as to improve a use ratio of the electric tool.

Figure 2:
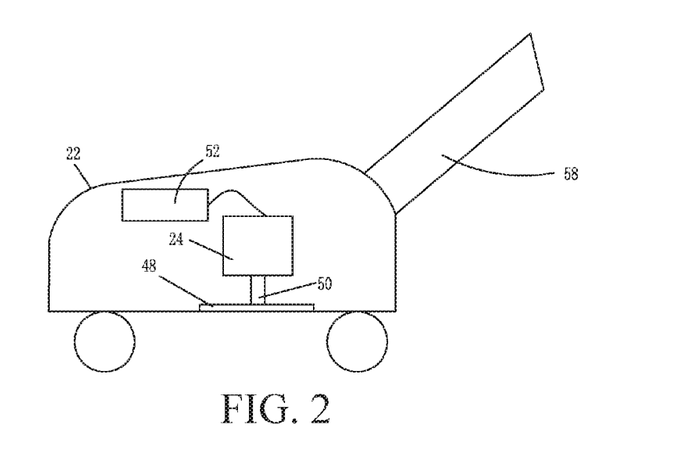
FIG. 2 is a schematic diagram of main working modules of the mower according to the first embodiment of the present invention.

Referring to FIG. 1 and FIG. 2, as an electric tool, the mower 20 stated here is an electric mower and includes a motor 24 providing power to a working component 48 for mowing, a switch controlling whether the motor 24 starts, and a power source providing energy to operation of the motor 24. Specifically, in this embodiment, the mower 20 includes a housing 22, a motor 24 accommodated in the housing 22, a working component 48 driven by the motor 24 and a transmission apparatus 50 disposed between the working component 48 and the motor 24. A battery component 52 is installed in the mower 20, and the battery component 52 is connected to the motor 24, to provide a direct current power source to the motor 24. The working component 48 usually includes at least one cutting blade (not shown in the figures). The cutting blade is connected to the motor 24 by using the transmission apparatus 50 to obtain rotary power, and the cutting blade rotatably works under driving of the motor 24. The mower 20 usually includes an operating handle 56, and the operating handle 56 is connected to the housing 22 by using an extension rod 58. The mower 20 may further include a roller. An operator holds the operating handle 56 and can push the mower 20. The roller can help the operator to easily mow along a particular path. The mower 20 includes, but is not limited to, the foregoing parts that make the mower 20 to work.

Figure 3:
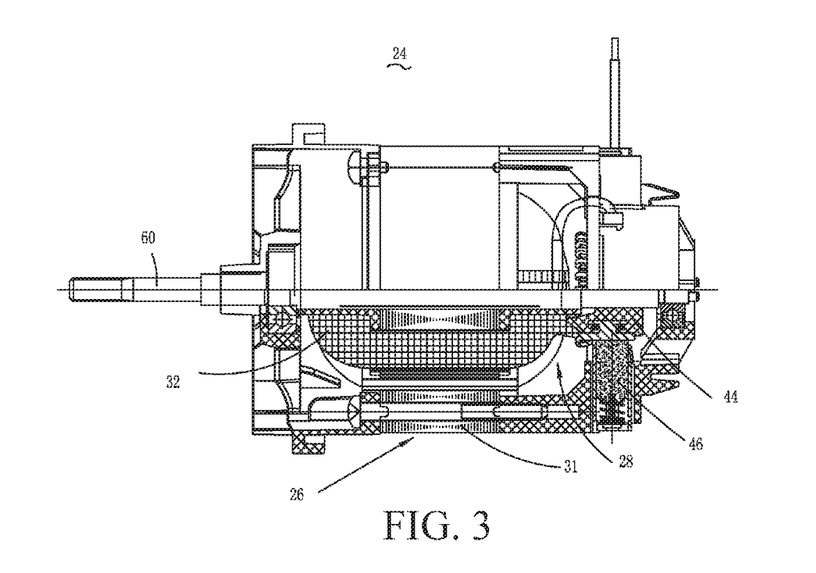
FIG. 3 is a schematic diagram of partial section view of a motor according to the first embodiment of the present invention.
Figure 4:
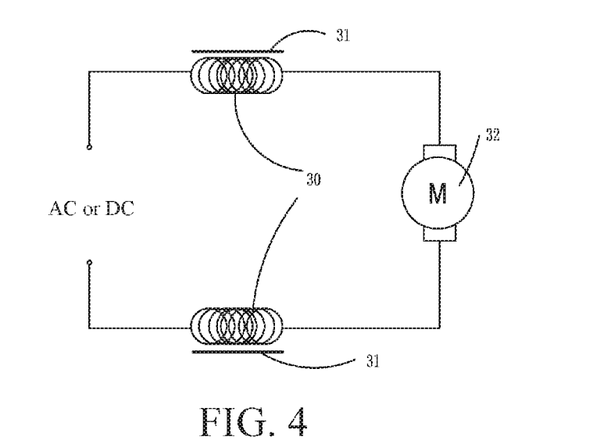
FIG. 4 is a schematic diagram of wiring of the motor according to the first embodiment of the present invention.

Referring to FIG. 3 to FIG. 4, the motor 24 includes a stator 26 and a rotor 28.

The stator 26 includes an excitation winding 30 and a stator iron core 31. After receiving an external input current, the excitation winding 30 generates a magnetic field.

The rotor 28 includes a rotor iron core, an armature winding 32, a pivot 60 supporting the rotor iron core and the armature winding 32 to rotate, and a commutator 44. The pivot 60 is used to transfer a torque and is usually formed by forging alloy steel. The rotor iron core is a part of a motor magnetic circuit and is a component affected by an electromagnetic force. The armature winding 32 has a function to generate an inductive potential and to generate an electromagnetic torque by using a current, implementing electromechanical energy conversion.

The motor 24 further includes an electric brush 46. The electric brush 46 is connected to the commutator 44 and is connected to an external circuit by means of electric wire extraction, so as to input electric power to the motor 24.

In this embodiment, the motor 24 is a series excited motor, and the excitation winding 30 of the motor 24 is connected to the armature winding 32 in series. When the motor 24 receives direct current power input, a current direction remains the same, and the motor 24 rotates according to a preset direction.

Figure 5:
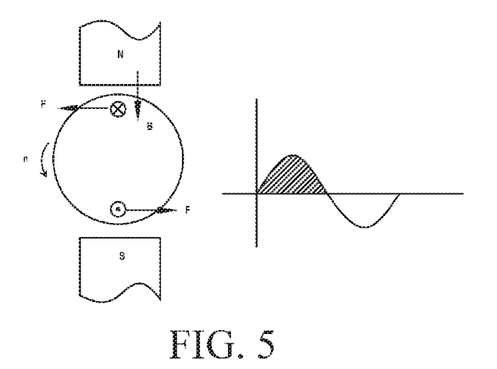
FIG. 5 is a schematic diagram of a principle that a motor works under alternating current input in a specific embodiment of the present invention, where a current is located in a first-half period.
Figure 6:
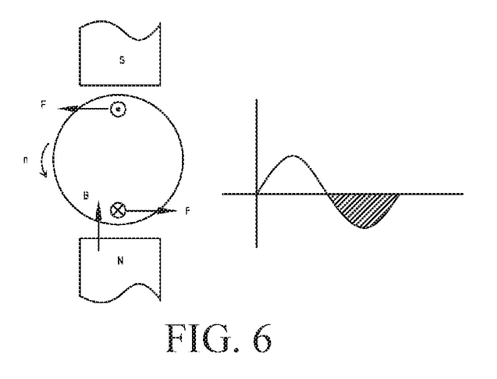
FIG. 6 is a schematic diagram of a principle that a motor works under alternating current input in a specific embodiment of the present invention, where a current is located in a second-half period.

Referring to FIG. 5 and FIG. 6, after the stator excitation winding 30 and the rotor winding of the motor 24 are connected in series, a single-phase alternating current power source is externally added. After being powered on, the stator excitation winding 30 generates a magnetic field, a current flows in the armature winding 32, and interaction between a rotor current and the stator magnetic field generates an electromagnetic torque to make the rotor 28 rotate. Because the stator 26 and rotor windings are connected in series, when the motor 24 works at a negative half cycle of a power source, stator 26 and rotor currents simultaneously invert, and the stator magnetic field also inverts, that is, the stator magnetic field and the rotor current simultaneously invert. According to the left-hand rule, the generated electromagnetic torque remains an original direction, and the motor 24 continuously runs in a same direction. An alternating current is a power source that changes positive and negative electrode directions of a current with a constant period. Regardless how positive and negative electrodes of the power source change, diversion of the motor 24 in this embodiment does not change. Therefore, when the motor 24 receives alternating current power input, the motor 24 may always rotate according to a preset direction.

Figure 7:
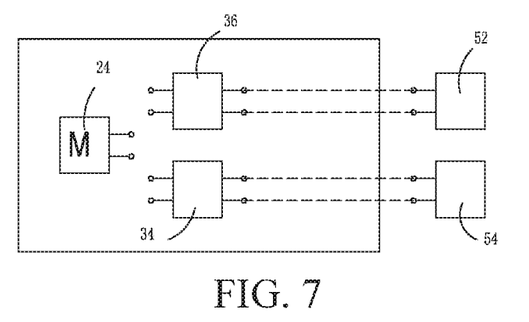
FIG. 7 is a schematic diagram of a connection relationship between a power source and the motor in the first embodiment of the present invention.

Referring to FIG. 7, a first power input unit 34 includes an electrode slice electrically connected to the motor 24. The first power input unit 34 is configured to connect to an external AC power source 54 so as to provide AC power input to the motor 24. One specific implementation manner of the first power input unit 34 includes a cable connected to the motor 24 and an electrode slice used for adapting to an AC power source. The electrode slice may be directly disposed on the housing 22 of the mower 20, so as to be connected to the AC power source. Another specific implementation manner of the first power input unit 34 includes a cable and an electrode slice that are connected to the motor 24. The cable may be set to be relatively long, to protrude from the mower 20 for a particular distance to help the user to connect the cable to the AC power source disposed at different positions in a matching manner. In this case, the electrode slice appears in a form of a plug connected to the external AC power source 54. The plug may be directly connected to the mower 20 and cannot be separated from the mower 20, and may also be made into a form of a pluggable adapter structure. When the plug is in a form of an adapter structure, if the mower 20 needs to be connected to the external AC power source 54, one end of the adapter may be connected to the mower 20, and the other end of the adapter is connected to the AC power source.

The AC power source itself is not a part of the electric tool and is usually disposed in a working place of the user. By connecting the cable, The AC power source is connected to the first power input unit 34, so that the mower 20 obtains AC power input. Usually, a frequency of AC power source is 50 Hz or 60 Hz.

The second power input unit 36 includes an electrode slice connected to the motor 24. The second power input unit 36 is configured to connect to a battery component 52 so as to provide DC power input to the motor 24. One specific implementation manner of the second power input unit 36 includes an accommodating groove disposed on the housing 22 of the mower 20 and an electrode slice located within the accommodating groove. Preferably, a quantity of the accommodating grooves is set according to a quantity of battery components 52. A size of the accommodating groove is corresponding to a size of a battery component 52 that is correspondingly placed on the accommodating groove and is matched with the electrode slice. In a preferable implementation manner, the quantity of the accommodating grooves is two, and an electrode slice that can be electrically connected to the motor 24 is disposed in each accommodating groove. Electrode slices in different accommodating grooves may be connected in series or may be connected in parallel. Therefore, after being placed into the battery component 52, the electrode slices may provide direct current power input of different voltages or currents to the motor 24.

The battery component 52 is usually detachably connected to the mower 20 housing 22. Certainly, in some mowers, battery components are directly fixedly disposed in the housing as a part of the mowers. Moreover, to prevent the battery component 52 from outside pollution, accommodating space of the battery component 52 is set to be an enclosed structure. To make the battery component 52 obtain supplement after energy is completely released, the battery component 52 can be connected to an external charging device by using a cable for charging.

The battery component 52 includes a rechargeable battery pack. Preferably, a lithium battery pack is used, and has a light weight but can provide enough energy required by operation of the mower 20. A quantity of the battery packs may be one. To satisfy cutting needs of a large area, a rated capacity of the battery pack is as large as possible. However, a larger capacity leads to a corresponding increase in weight and manufacturing costs of the battery pack. Therefore, it is better to find a balance between the capacity and the weight. Preferably, a rated voltage of the battery pack may be set to 56 V, and the quantity of the battery packs is two. Therefore, after the mower 20 is connected to the battery component 52, the motor 24 can obtain direct current power input of 112 V. The first power input unit 34 of the mower 20 is connected to the AC power source of 110 V, so that the motor 24 obtains AC power input of 110 V. In this case, power input voltages provided by the first power input unit 34 and the second power input unit 36 to the motor 24 of the mower 20 are basically the same. Also, there is no need to consider the motor's adaptation to multiple voltages in structural design of the motor 24. The motor 24 has a simple structure and has a particular advantage in costs. Moreover, many mowers in the market are configured with a battery component of 56 V. Two battery components of 56 V are connected in series so as to obtain a relatively high voltage to power the mower 20. Such a design fully uses the battery packets on an electric tool that a user already has. Universality of the product is good.

According to the foregoing description, preferably, power input voltages provided by the first power input unit 34 and the second power input unit 36 to the motor 24 are basically within a same predetermined voltage range. The term "same" herein is not strict conformance in mathematical meanings but is rough equivalence that can be borne by a rotation speed of the motor 24 within a particular range. Preferably, the predetermined voltage range is 80 V to 120 V.

In a specific embodiment, the first power input unit 34 is connected to the external AC power source 54 and provides AC power input of 110 V to the motor 24. The second power input unit 36 is connected to the battery component 52 and provides DC power input of 112 V to the motor 24. In this case, two power input voltages are not exactly consistent. However, for the motor 24, the difference between the two voltages may be ignored.

In another specific embodiment, same as the previous embodiment, the first power input unit 34 is connected to the external AC power source 54 and provides AC power input of 110 V to the motor 24. A difference lies in that the second power input unit 36 is connected to a battery component 52 of which the rated voltage is 100 V. The battery component 52 can provide DC power input of 100 V to the motor 24. A difference between the two power input voltages in this case is 10 V. However, for the motor 24, the difference can be accepted and cannot obviously affect operation of the mower 20. In this case, the battery component 52 includes a battery packet, a rated voltage of the battery pack is 100 V, and a volume, a weight, and a power of such a battery component can achieve relatively good effects. Certainly, the voltage of the battery pack may also be designed to be exactly the same as an input voltage of the AC power source. For example, an input voltage provided by a battery component 52 corresponding to AC power input of 120 V is also 120 V.

In the foregoing two embodiments, voltages of power input provided by the first power input unit 34 and the second power input unit 36 are basically within a same predetermined voltage range. Accordingly, when the motor 24 is designed, only related requirements within the voltage range need to be considered; the motor 24 is easily designed. Moreover, the rotor 28 of the whole motor 24 includes only a group of armature windings 32, and correspondingly configured with a commutator 44 and a pair of electric brushes 46. The rotor 28 has a simple structure and is conveniently assembled. The stator 26 of the motor 24 uses structural forms of an iron core 31 and an excitation winding 30, and does not need to introduce a permanent magnet with a relatively high cost. The stator 26 has a particular advantage in costs. A stator 26 in a common direct current motor is a permanent magnet. To adapt to the AC power source, a rectifier and a step-down transformer need to be designed to convert an AC into a DC and be input to the motor 24 after voltage step-down. The structure of this design is relatively complex. It needs many electronic devices and the reliability is not high. Besides, energy loss exists in a conversion process and has particular impact on efficiency. Further, compared with a technical solution of using two groups of armature windings 32 to separately adapt an AC power source and a DC power source, only one group of armature windings 32 set in the rotor 28 of the motor 24 is simple in structure.

It can be understood that voltages of power input provided by the first power input unit 34 and the second power input unit 36 may also be 220 V or 230 V. In this case, a predetermined voltage range is 200 V to 250 V and includes common rated alternating current voltage values. The battery component 52 may include four lithium battery packs whose rated voltages are 56 V or two lithium battery packs whose rated voltages are 100 V. Other quantities of battery packs and battery packs with other rated voltages may be used according to needs of design.

A power source control unit 38 is disposed on the mower 20 and is configured to control power input. In a specific embodiment, the power source control unit 38 includes a mode selection switch and an operating member. The operating member operably controls the mode selection switch to be in different working modes. One working mode is an AC power input mode. In this mode, the first power input unit 34 is electrically connected to the motor 24. When the first power input unit 34 is connected to the external AC power source 54, the motor 24 can obtain AC power input. Another working mode is DC power input mode. In this mode, the second power input unit 36 is electrically connected to the motor 24. When the second power input unit 36 is connected to the battery component 52, the motor 24 can obtain DC power input. The operating member may be in a form of a button or may be designed in a knob form. A movement manner of the operating member may be rotation, translation, or another compound motion form. Any movement manner is feasible as only as the mode selection switch is made to be in different working modes.

Figure 8:
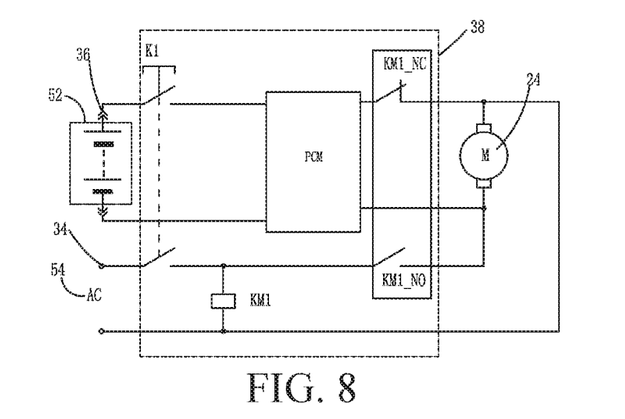
FIG. 8 is a schematic diagram of a power control circuit of the mower according to the first embodiment of the present invention, where a battery component and an AC power source coexist, but a motor start switch K1 is in a still-not-closed state.
Figure 9:
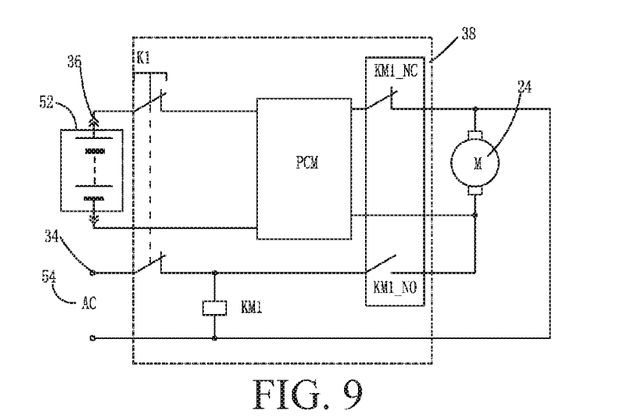
FIG. 9 is a schematic diagram of the power control circuit of the mower according to the first embodiment of the present invention, where an AC power source is not connected, and a motor start switch K1 is in a closed state.
Figure 10:
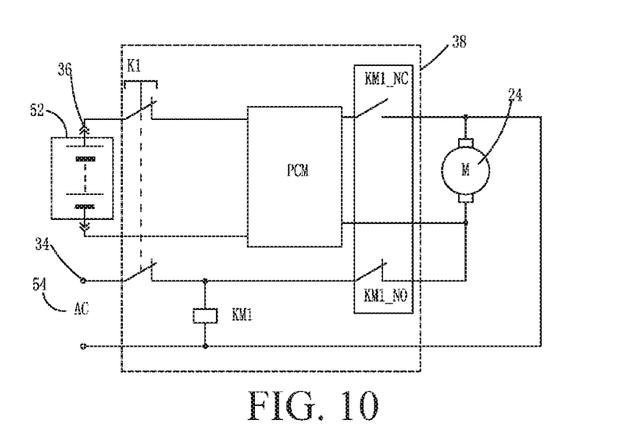
FIG. 10 is a schematic diagram of the power control circuit of the mower according to the first embodiment of the present invention, where an AC power source is connected, and a motor start switch K1 is in a closed state.

FIG. 8 to FIG. 10 are schematic diagrams of a circuit of a power source control unit 38 of a mower 20 according to the first embodiment of the present invention. A power source control unit 38 in an electronic interlocking manner is used in this embodiment.

It can be seen that in FIG. 8, an external AC power source 54 and the battery component 52 may be separately simultaneously connected to the first power input unit 34 and the second power input unit 36. A motor start switch K1 is in an untriggered state. In this case, either the battery component 52 or the external AC power source 54 and the motor 24 are not in a connected state. The motor 24 cannot obtain power input. The power source control unit 38 includes a battery protection board PCM, configured to detect and protect a status of the battery component 52. The battery protection board ensures that overcharge, over discharge, overcurrent, short circuits, and ultra-temperature charging and discharging do not occur to the battery component 52.

In FIG. 9, the external AC power source 54 is not connected to the first power input unit 34, and only the battery component 52 is connected to the second power input unit 36. The motor start switch K1 is in a triggered state. In this case, because the external AC power source 54 is still not connected to the first power input unit 34, a contact KM1-NO of a relay is in a disconnected state, and a circuit connects the AC power source, with the motor cannot be connected. Because the motor start switch K1 is closed, the battery component 52 and the motor 24 constitutes a complete loop, to provide DC power input to the motor 24.

In FIG. 10, the external AC power source 54 is connected to the first power input unit 34, the motor start switch K1 is in a triggered state, and the battery component 52 is connected to the second power input unit 36. However, due to existence of the external AC power source 54, the contact KM1-NO of the relay is closed in response, and KM1-NC is correspondingly disconnected. In this case, although the battery component 52 and the external AC power source 54 are separately simultaneously connected to the first power input unit 34 and the second power input unit 36, because the contact KM1-NC of the relay is in a disconnected state, the battery component 52 cannot provide DC power input to the motor 24, and only the external AC power source 54 provides AC power input to the motor 24.

In this specific embodiment, it can be understood that the mode selection switch is alternatively located in different working modes. When the external AC power source 54 is not connected to the first power input unit 34, the mode selection switch is in a DC power input mode. When the external AC power source 54 is connected to the first power input unit 34, the mode selection switch is in an AC power input mode. In addition, in this embodiment, whether the battery component 52 is connected to the second power input unit 36, once the external AC power source 54 is connected to the first power input unit 34, the mode switch is made to be in an AC power input mode by operating the mode selection switch. That is, in this embodiment, whether the battery component 52 is connected to the power input unit, once the external AC power source 54 is connected to the power input unit, the mode selection switch preferably selects the external AC power source 54 to provide an alternating current to the motor 24. Such a setting may effectively save energy loss in the battery component 52.

In this embodiment, the first power input unit 34 is directly connected to the motor 24. After the external AC power source 54 is connected to the first power input unit 34, the motor 24 can receive operation of an alternating current, there is no link of converting the alternating current into a direct current between the external AC power source 54 and the motor 24. The motor 24 and the control circuit have simple structures.

Figure 11:
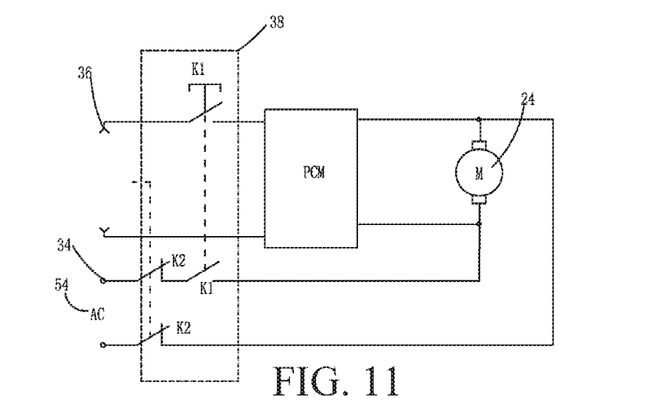
FIG. 11 is a schematic diagram of a power control circuit of a mower according to a second embodiment of the present invention, where a battery component is not connected, and a motor start switch K1 is in still-not-closed state.
Figure 12:
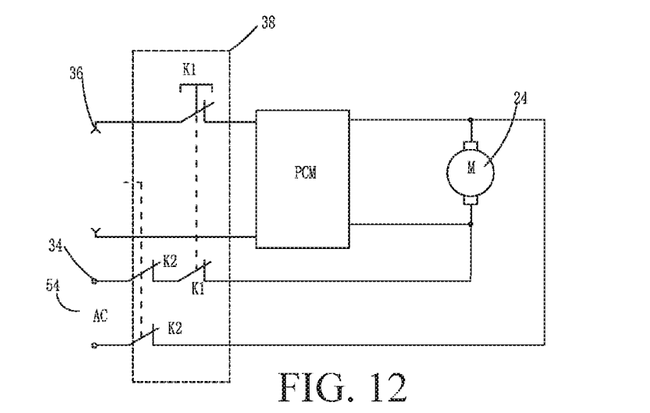
FIG. 12 is a schematic diagram of the power control circuit of the mower according to the second embodiment of the present invention, where a battery component is not connected, and a motor start switch K1 is in a closed state.
Figure 13:
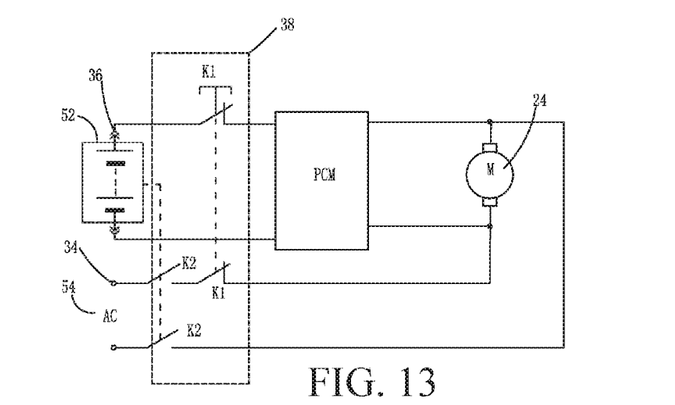
FIG. 13 is a schematic diagram of the power control circuit of the mower according to the second embodiment of the present invention, where a battery component is connected, and a motor start switch K1 is in a closed state.

FIG. 11 to FIG. 13 are schematic diagrams of a circuit of a power source control unit 38 of a mower 20 according to a second embodiment of the present invention. A power source control unit 38 in an mechanical interlocking manner is used in this embodiment.

It can be seen that in FIG. 11, the external AC power source 54 is connected to the first power input unit 34, the battery component 52 is not connected to the second power input unit 36, and the power source control unit 38 includes the motor start switch K1. Because the motor start switch K1 is in an untriggered state, a mechanical interlocking switch K2 in response to whether the battery component 52 exists is in a closed state. In this case, whether the battery component 52 or the external AC power source 54 and the motor 24 are not in a connected state, the motor 24 cannot obtain power input.

In FIG. 12, the external AC power source 54 is connected to the first power input unit 34. The battery component 52 is still not connected to the second power input unit 36, and the motor start switch K1 is in a triggered state. In this case, no battery component 52 provides power input to the motor, the motor 24 can only obtain AC power input from the external AC power source 54, and the motor start switch K1 is in an AC power input mode.

In FIG. 13, the external AC power source 54 is connected to the first power input unit 34, the battery component 52 is connected to the second power input unit 36, the mechanical interlocking switch K2 in response to whether the battery component 52 exists is in a disconnected state, and the motor start switch K1 is in a triggered state. In this case, the battery component 52 and the motor 24 form a closed path and provide DC power input to the motor 24, while the external AC power source 54 cannot provide power input to the motor 24 because the switch K2 is disconnected, and the motor start switch K1 is in a DC power input mode.

In this embodiment, it can be understood that the mode selection switch is alternatively located in different working modes. When the battery component 52 is not connected to the second power input unit 36, the mode selection switch is in an AC power input mode. When the battery component 52 is connected to the second power input unit 36, the mode selection switch is in a DC power input mode. In addition, in this embodiment, whether the external AC power source 54 is connected to the first power input unit 34 or not, once the battery component 52 is connected to the second power input unit 36, the mode switch is made to be in a DC power input mode by operating the mode selection switch. That is, in this embodiment, whether the external AC power source 54 is connected to the first power input unit 34, once a battery component 52 exists, the mode selection switch preferably selects the battery component 52 to provide a direct current to the motor 24.

Similarly, in this embodiment, the first power input unit 34 is directly connected to the motor 24. After the external AC power source 54 is connected to the first power input unit 34, the motor 24 can receive operation of an alternating current, there is no link of converting the alternating current into a direct current between the external AC power source 54 and the motor 24. The motor 24 and the control circuit have simple structures.

Certainly, it can be understood that the mode selection switch may be of another switch form. The mode selection switch may be set to be operably located at three positions. At a first position, the mode selection switch is connected to the motor 24 and the first power input unit 34. When the first power input unit 34 is connected to the external AC power source 54, the external AC power source 54 can provide AC power input to the motor 24. At a second position, the mode selection switch is connected to the motor 24 and the second power input unit 36, but when the second power input unit 36 is connected to the battery component 52, the battery component 52 can provide DC power input to the motor 24. At a third position, the mode selection switch neither connect the motor 24 to the first power input unit 34 nor connect the motor 24 to the second power input unit 36. Therefore, the motor 24 is in an unable-to-start state. A user may select, according to needs, to operate the mode selection switch to be at different positions. Therefore, operating members correspondingly operating the mode selection switch should also have three different mode signs. Specific mode signs may be different color blocks, battery components, AC figures, stop symbols, or the like. In a specific embodiment, the mode selection switch sets a stop position to be in the middle. Two corresponding positions of an AC mode and a DC mode is at both sides of the top position. For the user, if the external AC power source 54 and the battery component simultaneously exist, the user may select to use one of the modes as power input according to needs of the user. Once one mode is selected, even if another power source opposite to the corresponding working mode is connected to the motor 24, it will not provide input to the motor 24. For example, if only the external AC power source 54 is connected to the electric tool, even if the user selects the DC mode, there is no DC power input and no AC power input. By means of such a setting, the user is more flexible and may perform a selection according to different working situations.

Further, a charging management module may be disposed between the first power input unit 34 and the second power input unit 36. When the battery component 52 is connected to the second power input unit 36 and the external AC power source 54 is connected to the first power input unit 34, the charging management module may be selected by charging mode selection switch to detect an electric quantity of the battery component 52. If it is found that a remaining electric quantity of the battery component 52 is lower than a particular preset value, the charging management module can control the external AC power source 54 to charge the battery component 52. In one embodiment, the external AC power source 54 charges the battery component 52 when the battery component 52 does not work. In another embodiment, the external AC power source 54 may charge the battery component 52 while the mower 20 performs a cutting operation.

In another specific embodiment, the electric tool includes a housing 22 and a series excited motor accommodated in the housing 22. The series excited motor provides power to a working component 48. The series excited motor is selectively connected to one of the AC power source and the battery component 52, and when the motor 24 is connected to the external AC power source 54, runs after receiving an alternating current. When the motor 24 is connected to the battery component 52, runs after receiving a direct current. Specifically, a power input voltage provided by the AC power source may be different from an input voltage provided by the battery component 52. For example, the power input voltage provided by the AC power source is 120 V, and the input voltage provided by the battery component is 56 V. When the battery component 52 is connected to the motor 24, the power source control unit 38 controls the motor 24 to receive a direct current inputted by the battery component 52. That is, the direct current power input powers the motor 24 in a form of a direct current. When the external AC power source 54 is connected to the motor 24, the power source control unit 38 controls the motor 24 to receive an alternating current. That is, power input provided by the AC power source powers the motor 24 in a form of an alternating current and does not convert the alternating current into a direct current. However, to make the motor 24 work under an appropriate voltage, it may be considered that alternating current power input is stepped down by using a silicon controlled thyristor. In this case, the motor 24 still receives an alternating current, but correspondingly the input voltage is reduced to 60 V. The input voltage provided by the battery component 52 may be other voltage values, such as 56 V and 55 V. The alternating current power input is stepped down by using the silicon controlled thyristor and is provided to the motor 24. Hence, the motor 24 may work under alternating current input of 56 V or work under direct current input of 56 V. An operator can reasonably select power input in different working conditions. Moreover, a used motor structure is simple and has a low cost.

In the foregoing embodiment, the motors all use series excited motors, to be applicable to an AC power source as well a DC power source. Whether the external AC power source 54 or the battery component 52 is connected to the mower 20 to provide power input to the motor 24, the motor 24 can normally operate, to provide stable power output to the working component 48. In addition, because AC power input does not need to be converted into DC power input, and the motor 24 does not need to configure a rectifier, the motor 24 has a simple structure and has small electromagnetic interference.

For the mower 20, the working component 48 is a cutting blade. If for power tools of another type, the working component may be of another type. Such as for a sweeper, the working component may include a rotary sweeping head. For a grass trimmer, a working component includes a rotary working head and a grass trimming line disposed on the working head.

A person of ordinary skill in the art will understand that the present invention may also have other implementation manners as long as essence of a used technology is the same or similar to the present invention, or any variation and replacement made based on the present invention is within a protection scope of the present invention.

What is claimed is:

1. An electric tool, comprising:
    a housing;
    a motor, accommodated in the housing and configured to provide power to a working component, wherein
    the motor comprises a stator comprising an excitation winding and a rotor comprising an armature winding, and the excitation winding is connected in series to the armature winding;
    a first power input unit configured to connect the motor directly to an external AC power source so as to provide an alternating current originating at the external AC power source directly to the motor;
    a second power input unit, configured to connect to a battery component so as to provide a direct current to the motor; and
    a power source control unit, configured to control the motor to obtain power input by using one of the first power input unit and the second power input unit.

2. The electric tool according to claim 1, wherein the electric tool further comprises the battery component, and the battery component is connected to the second power input unit.

3. The electric tool according to claim 2, wherein the battery component comprises a battery pack, and a rated voltage of the battery pack is 110V.

4. The electric tool according to claim 3, wherein the battery component is a lithium battery pack.

5. The electric tool according to claim 1, wherein power input voltages provided by the first power input unit and the second power input unit are within a same predetermined voltage range.

6. The electric tool according to claim 5, wherein the predetermined voltage range is from 80 V to 120 V.

7. The electric tool according to claim 1, wherein the power source control unit comprises a mode selection switch, the mode selection switch configured to operably connect one of the first power input unit and the second power input unit to the motor and disconnect the other one of the first power input unit and the second power input unit from the motor.

8. An electric tool, comprising:
    a housing having a first groove and a second groove formed thereon;
    a first electrode disposed in the first groove;
    a second electrode disposed in the second groove;
    a series excited motor, accommodated in the housing and configured to provide power to a working component, the series excited motor electrically connected to one or more battery components via the first electrode and the second electrode, wherein
    the series excited motor comprises a stator, a rotor, and an electric brush, the stator comprises a stator iron core and an excitation winding, the rotor comprises a rotor iron core, an armature winding winded on the rotor iron core, a pivot configured to support the rotor iron core to rotate, and a commutator fixed on the pivot, the commutator is connected to the electric brush, and the excitation winding is connected to the armature winding in series; and a power source control unit, comprising a mode selection switch configured to operate in different working modes, wherein when the mode selection switch is in an AC working mode, the series excited motor obtains an alternating current, and when the mode selection switch is in a DC working mode, the series excited motor obtains a direct current via the first electrode and the second electrode.

9. An electric tool, comprising:
a housing having a first groove and a second groove formed thereon;
a series excited motor, accommodated in the housing and configured to provide power to a working component, wherein
the series excited motor comprises a stator, a rotor, and an electric brush, the stator comprises a stator iron core and an excitation winding, the rotor comprises a rotor iron core, an armature winding winded on the rotor iron core, a pivot supporting the rotor iron core to rotate, and a commutator fixed on the pivot, the electric brush is connected to the commutator, and the excitation winding is connected to the armature winding in series;
a first power input unit configured to connect the series excited motor directly to an external AC power source, the first power input unit further configured to provide an alternating current originating at the external AC power source directly to the series excited motor when connected to the external AC power source; and
a second power input unit comprising a first electrode disposed in the first groove and a second electrode disposed in the second groove, the first electrode and the second electrode configured to electrically connect the series excited motor to one or more battery components so as to provide a direct current to the series excited motor, wherein
power input voltages provided to the series excited motor by the first power input unit and the second power input unit are both within a predetermined voltage range of 80 V to 120 V.

10. An electric tool, comprising:
housing;
a series excited motor, accommodated in the housing and providing power to a working component, wherein
the series excited motor is selectively connected to one of an AC power source and a battery component, the series excited motor is connected to an external AC power source and is configured to run after receiving an alternating current, the series excited motor is connected to one or more battery components and is configured to run after receiving a direct current, and power input voltages provided by the external AC power source and the one or more battery components are within a predetermined range from 80 V to 120 V.

11. The electric tool of claim 10, wherein the housing has a first groove and a second groove formed thereon, and the electric tool further comprises:
a first electrode disposed in the first groove; and
a second electrode disposed in the second groove;
wherein the first electrode and the second electrode are configured to connect the series excited motor to the battery component.

12. The electric tool of claim 11, wherein the first electrode and the second electrode are configured to electrically connect the one or more battery components to the series excited motor in series.

13. The electric tool of claim 10, further comprising a power input unit configured to connect the series excited motor directly to the external AC power source to directly provide the alternating current to the series excited motor from the external AC power source.

14. The electric tool of claim 8, further comprising a power input unit configured to connect the series excited motor directly to an external AC power source from which the alternating current originates to directly provide the alternating current to the series excited motor.

15. The electric tool of claim 8, wherein a number of the one or more battery components is two battery components corresponding to a first battery electrically connected to the first electrode and a second battery electrically connected to the second electrode.

16. The electric tool of claim 8, wherein the first electrode is configured to provide a different voltage or current to the motor from the one or more battery components.

17. The electric tool of claim 8, wherein a first size of the first groove and a second size of the second groove are matched with sizes of the one or more battery components.

18. The electric tool of claim 8, wherein the first electrode and the second electrode are configured to electrically connect the one or more battery components in series to the motor.

19. The electric tool of claim 8, wherein the first electrode and the second electrode are configured to electrically connect the one or more battery components in parallel to the motor.

20. The electric tool of claim 1, wherein the second power unit comprises two electrodes disposed in two grooves, respectively, on the housing.

* * * * *

UNITED STATES PATENT AND TRADEMARK OFFICE
CERTIFICATE OF CORRECTION

PATENT NO. : 10,868,462 B2  
APPLICATION NO. : 15/509123  
DATED : December 15, 2020  
INVENTOR(S) : Guoliang Mou It is certified that error appears in the above-identified patent and that said Letters Patent is hereby corrected as shown below:

In the Claims  
Claim 10, Column 13, Line 41, change "housing;" to --a housing;--

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*